United States Patent [19]
Cances et al.

[11] Patent Number: 5,355,138
[45] Date of Patent: Oct. 11, 1994

[54] ANTENNA BEAM COVERAGE RECONFIGURATION

[75] Inventors: Jean-Pierre Cances, Toulouse; Gérard Maral, Goyrans; Bernard Coulomb, Toulouse; Régis Lenormand, Blagnac, all of France

[73] Assignee: France Telecom, Paris, France

[21] Appl. No.: 118,664

[22] Filed: Sep. 10, 1993

[30] Foreign Application Priority Data

Sep. 11, 1992 [FR] France .................. 92 10871

[51] Int. Cl.$^5$ .......................... H04B 7/185
[52] U.S. Cl. ...................... 342/354; 342/352; 455/12.1
[58] Field of Search .......... 342/352, 354; 455/12.1, 455/13.1, 13.4

[56] References Cited
U.S. PATENT DOCUMENTS 5,268,694  12/1993  Jan et al. .................. 342/354

OTHER PUBLICATIONS

"Spacecraft Multi-Beam and Contoured-Beam Antennas", by P. Balling.

Primary Examiner—Theodore M. Blum
Attorney, Agent, or Firm—Laubscher & Laubscher

[57] ABSTRACT

A earth station calling another station sends a link setting-up a request to a control station. The control station memorizes in a transformed reference system the contour of a global geographical coverage including all the earth stations together with the earth positions of the latter. Subsequent to the request, the control station simulates the optimum evolution of the radioelectric coverages of the satellite so as to include, both on emitting and receiving, the calling and called stations in respective coverages with guaranteed minimum antenna gains. The total power of the satellite and the positions of the stations are notably considered in this simulation. If the result of simulation is positive, an emission authorization is sent by the control station to the calling station, and satellite antennae are reconfigured by phase shift and power control values emitted by the control station.

9 Claims, 8 Drawing Sheets

FIG.8 (Sub-step $E_{12}$)

FIG.9 (Sub-step $E_{13}$)

FIG.10
(Sub-step $E_{11b}$)

FIG.12
(Sub-step $E_{24}$)

FIG. 11

ANTENNA BEAM COVERAGE RECONFIGURATION

BACKGROUND OF THE INVENTION

1. Field of the Invention

This invention relates very generally to telecommunications between earth transmitting-receiving stations via a satellite.

More exactly, the invention relates to a satellite radioelectric beam coverage reconfiguration method thereby dynamically managing beam coverages as a function of requests from earth stations, while maintaining beam coverages with minimum size to meet a power balance within the satellite. The radioelectric coverages of the satellite are reconfigured as a function of the variations in the traffic volume and the positions of stationary or moving earth stations using the satellite as radioelectric relay. This reconfiguration adapts the resources of the payload in the satellite to the characteristics of the traffic at each moment. The invention is especially suited for cases of sporadic traffic such as that generated by VSAT (Very Small Aperture Terminal) or mobile stations.

2. Description of the Prior Art

Initially the satellites were designed to route communications from one point to another, as via a cable, and the extended coverage of the satellite was utilized to set up long distance links. Thus the "Early Bird" satellite linked two stations on either side of the Atlantic Ocean. Owing to the limited performance of these satellites, earth stations equipped with large antennae and hence very costly, had to be used. The increase in size and power of the satellites has subsequently reduced the size of the earth stations and hence their cost and consequently multiplied the number of these stations. Another quality of the satellite resulting from its extended coverage and hence its capacity to diffuse or collect, has thus been utilized: instead of transmitting signals from one point to another, an emitter in a given station can emit to a large number of station receivers via the satellite or, conversely, a large number of station can emit to a central station.

The first designed satellites uses single-beam antennae which have certain drawbacks: either the satellite provides the coverage of a large earth surface but the satellite's antenna gain is limited by the aperture angle of the beam; or the satellite provides the coverage of a small earth surface and in this case the antenna gain is higher but the beam cannot cover stations that are geographically too distant. Thus with a single-beam satellite a choice must be made between firstly an extended coverage but with low antenna gain, and hence links with high error rates, and secondly, a reduced coverage with a high antenna gain but whereby stations that are too distant cannot be interconnected.

The multi-beam antenna techniques harmonize these two alternatives. The area coverage of the satellite is extended because it results from the juxtaposition of several beams, and each beam offers an antenna gain all the higher that the aperture of the beam is reduced. Typically the multi-beam antennae on board a satellite consist of radiating elements, and combined respectively with beam-forming networks. A beam-forming network supplying the radiating elements of an antenna further comprises phase-shifters and power dividers whereby the associated antenna can be configured in a special way. Both on receiving and on emitting the antenna is thus programmed for particular radiation patterns. A radiation pattern is notably expressed by a gain as a function of on an angle with respect to the antenna axis.

According to the prior art, two methods are chiefly used within the context of a multi-beam satellite.

According to a first method known as "scanning beam"-type, predetermined coverage areas are illuminated cyclically by a same antenna beam whose orientation is controlled by special control values programming a beam-forming network. The stations located in a given coverage area only emit or receive information when said area is illuminated by the beam. In the absence of any memorization unit on board the satellite, at least two beams are necessary at each time: one to establish an uplink from the emitters in the earth stations to the satellite, the other to establish a downlink from the satellite to the receivers in the earth stations.

According to a second known method, the proposal is to use on receiving and emitting a certain number of respective beams and allocate respective variable capacities to the beams by modifying the pass-band in each one of them. To do so a dynamic allocation of the payload channels is obtained between the beams as a function of the traffic request in these beams.

Thus, according to the prior technique, no beam coverage reconfiguration method is available to satisfy requests from earth stations as a function of their geographical positions and the traffic volumes.

OBJECTS OF THE INVENTION

The main object of the invention is to provide a method for reconfigurating antenna beam coverages in a satellite network, based on modifications or reconfigurations of beam radioelectric coverages on the ground, contrary to the known methods consisting in modifying capacities for predetermined beam coverages.

Another object of the invention is to satisfy requests from earth stations as a function of their geographical positions and volume traffics.

SUMMARY OF THE INVENTION

Accordingly, a method for reconfiguring coverages of in respective beams a satellite re-transmitting telecommunications set up between earth emitting-receiving stations by modifying the phase shifting and power control values of beam-forming means associated respectively to radiating means of said beams in said satellite, both on receiving for telecommunications emitted by first earth stations amongst said earth emitting-receiving stations to said satellite and on emitting for said telecommunications to be re-emitted by said satellite to second earth stations amongst said earth emitting-receiving stations, predetermined numbers of telecommunication channels being associated to said beams, respectively, to set up a telecommunication link between calling one and called one of said earth emitting-receiving stations via said satellite, said method being preceded by the transmission of a link setting-up request from said calling station to a control station, via a signalling channel of said satellite, said method comprising, by simulation in said control station, one of first and second alternatives separately for each of the calling and called stations, then a final step, ($a_1$)—said first alternative, wherein said each of the calling and called stations is not located in any of said coverages, comprising the first steps of:

($a_{10}$)—determining amongst all said coverages, a coverage nearest to said each of the calling and called stations into a nearest coverage, ($a_{11}$)—iteratively, reducing in size each of the coverages other than said nearest coverage, until said nearest coverage is modified to include in said nearest coverage said each of the calling and caller stations with a first antenna gain, and ($a_{12}$)—deriving a simulated link setting-up authorization for said each of the calling and called stations when one of said channels associated to said nearest coverage is free, and ($a_2$)—said second alternative wherein said each of the calling and called stations is located in one of said coverages comprising one of said two steps of, ($a_{20}$)—when at least one of said channels associated to said one of the coverages is free, deriving of a simulated link set up authorization for said each of the calling and called stations, ($a_{21}$)—when all said channels associated to said one of the coverages are busy, searching a coverage adjacent to said each of the calling and called stations and having a associated free channel, and in response to a searching having a positive result, exchanging of station load between said one of the coverages and said adjacent coverage by reducing said one of the coverages and increasing said adjacent coverage so that said each of the calling and called stations is located in said adjacent coverage, and deriving a simulated link setting-up authorization for said each of the calling and called stations, and (b)—said final step comprising, when simulated link setting-up authorizations are derived both for said calling and called stations, emitting an emission authorization to said calling station, and phase shift and power control values from said control station to said satellite to reconfigure said radiating means in said satellite.

According to another embodiment of the invention, said first alternative comprises parallel to said first steps, the steps of:

($a_{10}'$)—determining amongst all said coverages a lowermost surface coverage, ($a_{11}'$)—iteratively, reducing in size each of said coverages other than said lowermost surface coverage whilst maintaining in said converages stations which are active prior to said link setting-up request, until said lowermost surface coverage is increased to include in said lowermost surface coverage said each of the calling and called stations with a second antenna gain, then ($a_{12}'$)—selecting one of said lowermost surface coverage and nearest coverage into a selected coverage as a function of the higher of said first and second antenna gains to include said station in said selected coverage, and ($a_{13}'$)—deriving a simulated link setting-up authorization for said each of the calling and called stations when one of said channels associated to said selected coverage is free.

However, as an alternative, the first two steps in the first alternative can be replaced by the determinating and reducing steps ($a_{10}'$) and ($a_{11}'$) indicated above.

The control station comprises simulation digital processing means whereby all the computations relating to the aforesaid steps can be made. In order to make operational the method embodying the invention, notably in terms of simulation time by the control station, the beam coverages are memorized at each time in the control station in the form of discrete points associated to the contour points of said coverages, in a transformed reference system defined by:

$$u = \sin \theta \cos \Phi$$

$$v = \sin \theta \sin \Phi$$

in which $\theta$ and $\Phi$ respectively designate elevation and azimuth coordinates in a spherical reference system centered on said radiating means of the satellite.

This approximation of the coverage real contours by polygonal contours allows advantageous processes of computation by the control station.

Thus, according to a first aspect of these computation processes, the step of determining a coverage nearest to said each of the calling and called stations further comprises the steps of incrementing a director coefficient to define a sheaf of straight lines each passing through a point associated to said each of the calling and called stations and intercepting coverage polygon sides into respective intersection points, computating distances between said point associated to said each of the calling and called stations and said intersection points, and selecting of a minimum distance from said computed distances thereby determining a coverage whose a side is nearest to said associated point.

According to a second aspect of the computation processes said step of reducing in size each of the coverages other than said nearest coverage further comprises, for each side of a polygon associated to said each of the coverages in said transformed reference system, the steps of incrementing a parameter to define a sheaf of straight lines parallel to said each side, and determinating an intersection point associated to a first active station which is located in said each of the coverages with a straight line segment of said sheaf so that said straight line segment forms a side of said polygon of said each of the coverages reduced in size.

BRIEF DESCRIPTION OF THE DRAWINGS

Further features and advantages of the invention will be apparent more clearly from reading the following description of several preferred embodiments of the invention with reference to the corresponding accompanying drawings in which.

DESCRIPTION OF THE PREFERRED EMBODIMENTS

Figure 1:
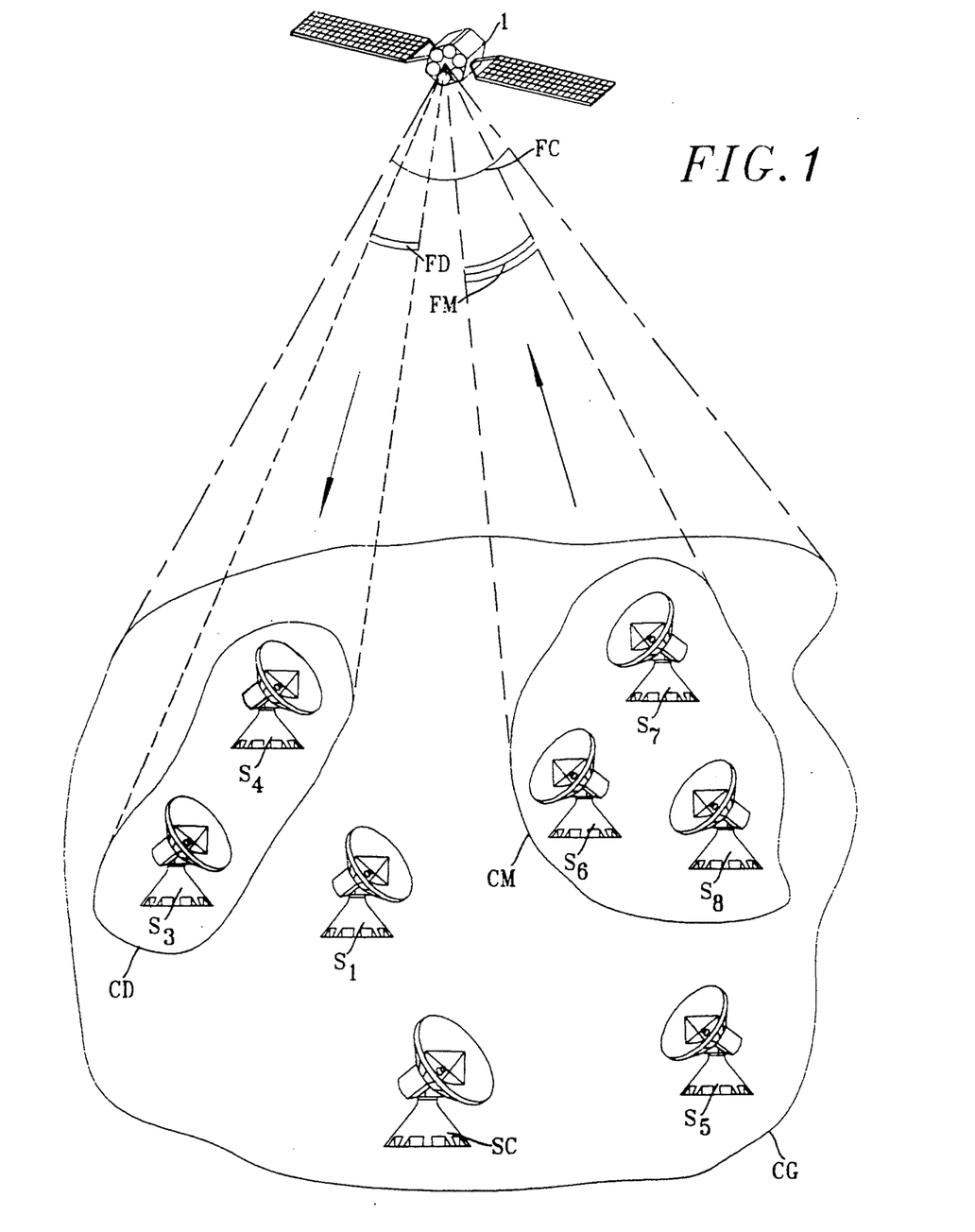
FIG. 1 shows a satellite network installation moreover including a satellite and a plurality of earth stations.

Referring to FIG. 1 a satellite network installation for carrying out the method embodying by the invention comprises a satellite 1, a plurality of earth stations $S_1$ to $S_8$ and a control station SC. On receiving, an antenna of satellite 1 is configured to provide a constant global coverage CG of a given earth surface including all the earth stations $S_1$ to $S_8$ and the control station SC, owing to a aperture angle of beam FC very wide. Any earth station $S_1$ to $S_8$ wishing to set up a link through the satellite network to transmit information to another earth station, sends a request to set up a link to the control station SC via satellite 1. This request is carried by a signalling channel of the global coverage receive beam FC in direction of satellite 1, to be re-transmitted to the control station SC. In response to the request the control station SC computes, by simulation, new beam coverages of satellite 1, both on emitting and receiving, and, through a specific link, transmits beam-forming network control values to program the coverages of the beams of several variable coverage antennae of satellite 1.

By way of example, referring to FIG. 1, it is assumed that earth station $S_5$ has to emit information to the called station $S_f$; it is necessary both to reconfigure, on emitting, the downlink beam FD whose transmission coverage CD does not include station $S_5$ and, on receiving, the uplink beam FM whose receive coverage CM does not include station $S_1$.

As will be shown hereafter the beam-forming network control values transmitted by control station SC control, in the satellite, phase shifters and power dividers transmitting/receiving signals to/from radiating element(s) of transmit/receive antennae of satellite 1, respectively.

The invention is not limited to the insertion of earth stations in the new beam coverages, but also comprises the reduction of the coverages so as to maintain a high antenna gain and hence good quality links in terms of error rate, the exchange of capacity between adjacent coverages so as to remedy the capacity saturation of a beam, etc.

Figure 2:
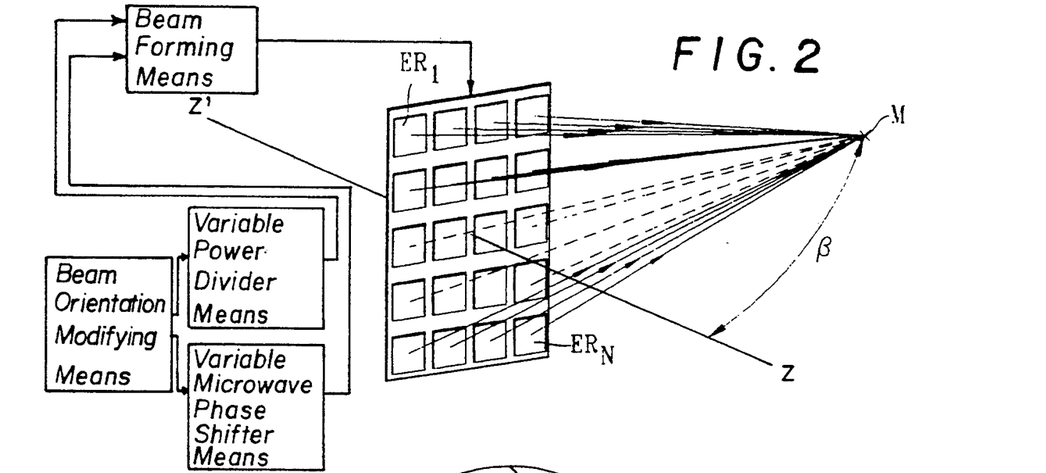
FIG. 2 shows schematically a antenna with radiating elements on board the satellite, fed by a beam configuration network.

As shown schematically in FIG. 2, an antenna with radiating elements, for example of the flat antenna type, comprises a plurality of radiating elements $ER_1$ to $ER_N$, whose the number can be very high, distributed over the surface of the antenna. The antenna assumed here to operate on emitting, is preceded by a beam-forming network. This beam-forming network further includes variable power dividers and variable microwave phase shifters associated with the radiating elements, respectively, and controlled by beam orientation modifying means. Through suitable choices of phase shifts in the phase shifters and power distributions through power dividers, various antenna radiation patterns are produced. The variations in these phase shifts and power distributions modify the inclination of the phase plane with respect to the surface of the radiating elements and the antenna gain and thus the orientation of the beam produced by the antenna and the beam aperture. Different radiation patterns are obtained in terms of gain as a function of the angle $\beta$ between the direction of radiation and the axis z'z of the antenna.

The radiating elements are spaced very slightly therebetween in view of optimum coupling and, at each point M located at a given distance from the antenna, the radiation results from the respective contribution of each radiating element.

On receiving, the principle of operation of the antenna is identical: phase shifters and power dividers are controlled in a suitable way to confer an optimum gain on the antenna for a given solid angle of the antenna of satellite 1, defining a reception beam.

The principle of operation of the radiating element antennae will not be dealt with further detail as it is assumed known to those skilled in the art.

Likewise, the computation by the control station SC of the phase and amplitude control values for the radiating elements of emitting and receiving antennae as a function of the optimum beam coverages obtained by simulation within the context of the method according to the invention will not be detailed. Nevertheless it will be remembered that the control station SC includes computing means to extract these control values which are transmitted, via the specific link, to the beam-forming networks in satellite 1. Digital processes of computing these control values as from desired beam coverages are for example the min-max method and the least squares method.

Figure 3:
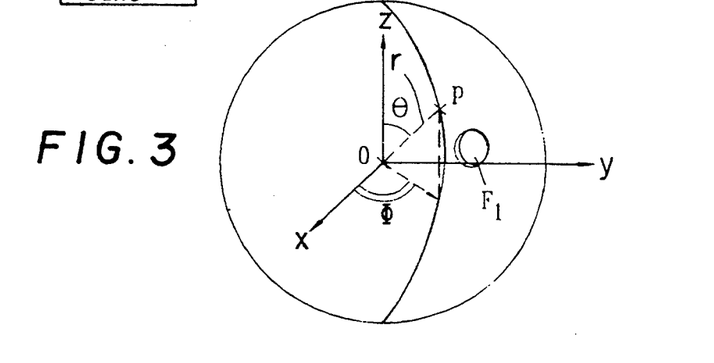
FIG. 3 shows a spherical coordinate reference system linked to the antenna of the satellite useful to a reference system transformation made within the context of the invention.

Referring to FIG. 3, a process for memorizing the contours of the beam coverages by control station SC is now referred to. This control station SC has to check, after reception of a request and the simulated modification of beam contours as will be described below, that the minimum gain for each beam coverage contour is greater than a minimum level corresponding to a minimum quality of the links for said beam. Such a computation of minimum gain can not be envisaged for the whole contour of the beam coverage. This solution would, in fact, involve the use of complex algorithms and hence very long computation times.

Thus, in practice, similarly to the processes of representing earth surfaces by digital processing computers, control station SC memorizes the beam coverage contours in a discrete form. Thus the gain computations on the coverage contour of each beam are only made for a certain number of discrete points on this contour.

For this purpose an angular spacing is chosen to define a "step" between each discrete point of the representation of the coverage. This angular spacing results from a compromise between the accuracy of the processings, or computations, achieved for the coverage contours and the speed of these processings by digital processing means in control station SC.

Moreover, as from this discrete beam coverage representation, the real coverage can be obtained by using algorithms of min-max or least squares type. From the real coverage are deduced beam forming network control values. As shown in FIG. 3, in a three-dimensional Cartesian system (O, x, y, z) centered on a radiating element antenna of satellite 1, any point P of the space is plotted by spherical coordinates ($\theta$, $\Phi$, r). To characterize a beam and hence a solid angle, only the angular coordinates, elevation $\theta$ and azimuth $\Phi$, are needed. Nevertheless it is more advantageous for the memorization of beam coverages by central station SC, to work within a transformed Cartesian system (u, v).

In this transformed reference system (u, v), the spherical coordinates ($\theta$, $\Phi$) needed to parameter a solid angle, here a beam, are transformed into coordinates (u, v) in the form:

$$u = \sin \theta \cdot \cos \Phi$$

$$v = \sin \theta \cdot \sin \Phi.$$

Through the bijective nature of this transformation, any result of computation made in the transformed reference system (u, v) can be transposed into the spherical coordinate system.

Thus in control station SC, each beam coverage contour is memorized in the form of a number of discrete points around said contour in the sampling transformed reference system (u, v). Elements additional to the notions described above are disclosed in the article "Spacecraft multi-beam and contoured-beam antennas" by P. Balling, published in Agard Lecture Series LS-151, pages 4-1 to 4-23, 1987.

Figure 4:
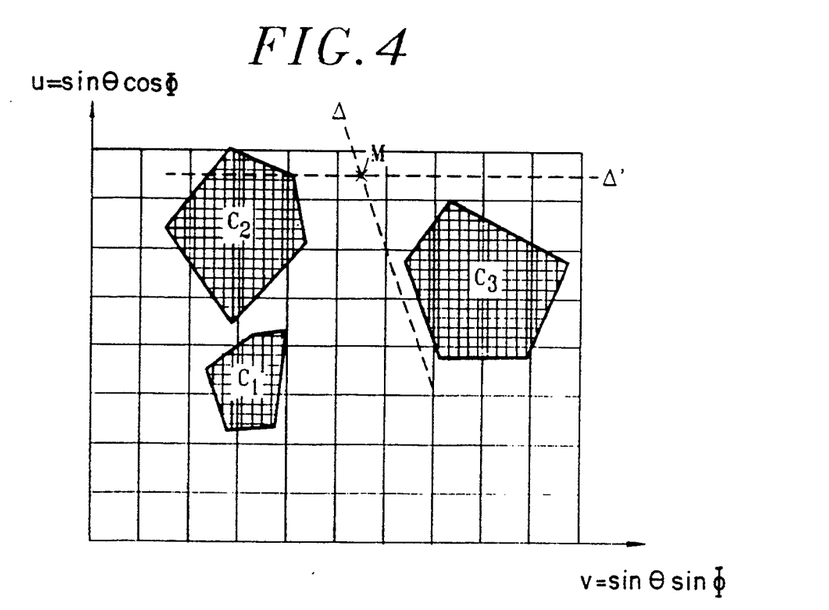
FIG. 4 is a beam coverage diagram in a transformed reference system.

As shown in FIG. 4, all beam coverage, whose form is substantially circular on the ground is represented in a discrete form in the transformed reference system (u, v) by a closed polygonal contour $C_1$, $C_2$, $C_3$ shown by straight line segments. Each contour constitutes an isogain contour inside which the gain is greater than a guaranteed minimum gain corresponding to an error rate or a determined quality of link.

Figure 5:
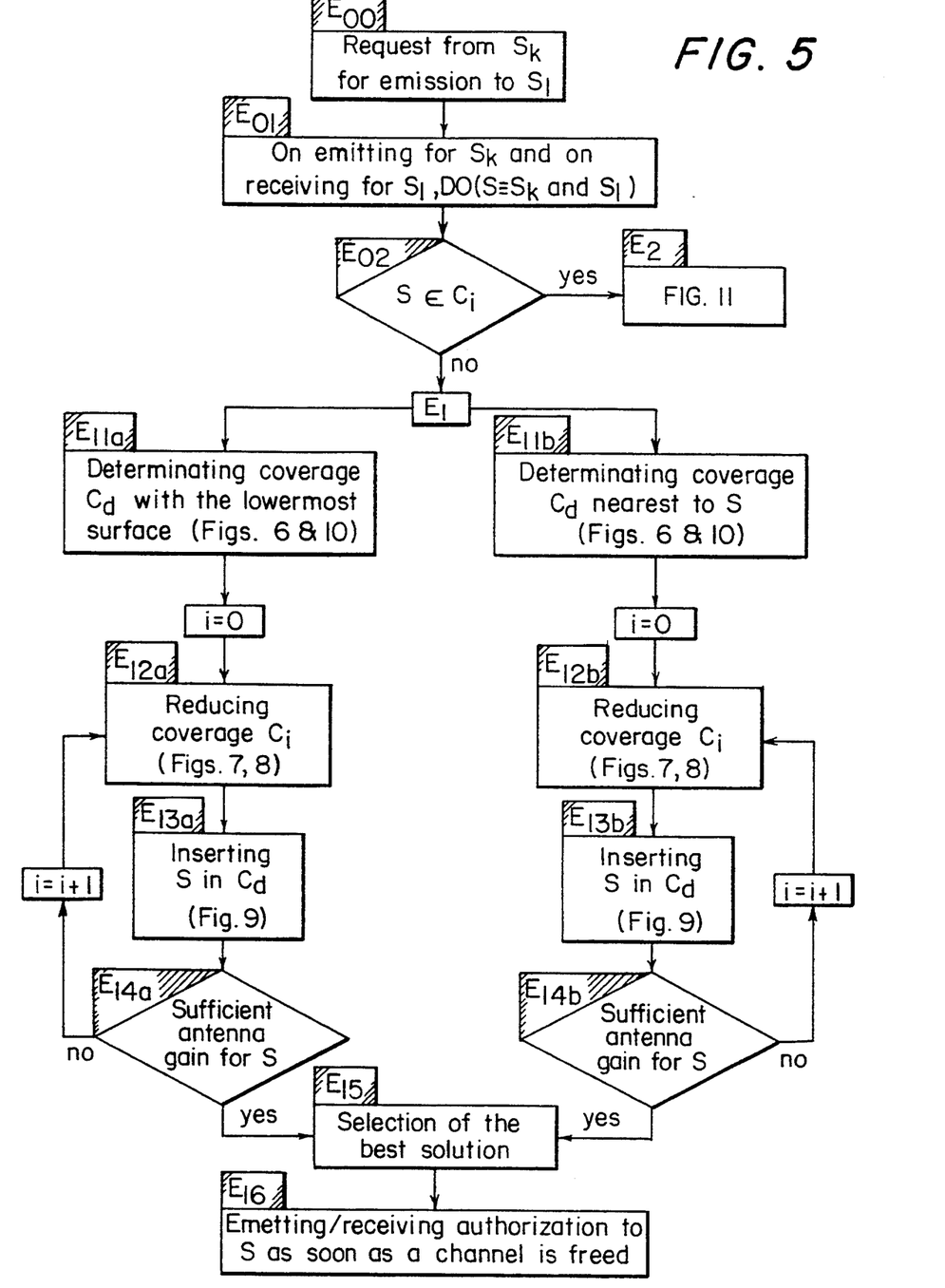
FIG. 5 is a main satellite beam configuration algorithm embodying by the invention.

The main steps of the satellite beam coverage reconfigurating method are now indicated referring to FIG. 5.

At the start of an initial step $E_{00}$, a station $S_k$ having to set up a link with a station $S_l$ so as to emit information thereto, previously sends a link setting-up request a link moreover comprising its address k and the address l of the called earth station $S_l$. This request, carried by the signalling channel of the global coverage receive beam CG, is received by satellite 1 and re-emitted to control station SC. Control station SC comprises simulating means for carrying out the method embodying the invention, and notably means for memorizing in reference system (u, v) discrete digitized representation of the global coverage on the ground seen from the satellite. In response to this request, station SC derives an emission authorization, or else a rejection, or else a demand to queue the request.

This answer is re-emitted to earth station $S_k$ via the signalling channel.

As previously signalled, the beam-forming networks associated to the antennae of satellite 1 are reconfigured both on receiving in order for the calling earth station $S_k$ to be included in a minimum gain receive coverage of an antenna of satellite 1, and on emitting so that the emission beam coverage of an antenna of satellite 1 covers the called station with a minimum antenna gain.

This latter point is high-lighted in step $E_{01}$ of the algorithm in FIG. 5. Thus one of two following series of steps $E_1$ and $E_2$ is performed, by simulation in the station SC, for the calling station $S_k$ and for the called station $S_l$ respectively, and the emission authorization or the rejection of the request is produced by station SC respectively according to whether the simulation according to the algorithm in FIG. 5 leads to a simulated authorization for the two calling and called stations $S_k$ and $S_l$, or to a simulated rejection for at least one of the two stations $S_k$ and $S_l$. In the rest of the description the two stations $S_k$ and $S_l$ are designated as station S, whilst being aware that the next series of sub-steps to be simulated for both stations $S_k$ and $S_l$ and provide simulated authorization results respectively for the two station $S_k$ and $S_l$ so that the emission authorization is transmitted from control station SC to station $S_k$.

In control station SC, the coverages of all the beams, both on emitting and receiving, of satellite 1 are memorized in discrete form as shown in FIG. 4, i.e., in the form of polygons in the transformed reference system (u, v). The "geographical" position in the system (u, v), and the associated address of each station are also memorized in station SC.

A final processing initial sub-step $E_{02}$ of the algorithm consists in studying if station S belongs to a emission coverage (when S is a calling party) or reception coverage (when S is a called party) with the given configuration of the beam-forming networks on receiving the link setting-up request.

According to a first alternative (step $E_1$), station S does not belong to a beam coverage $C_i$, the other alternative being described subsequently referring to FIG. 11. Thus station S is, like stations $S_1$ or $S_5$ in FIG. 1, located outside a beam coverage. Modification of the coverage of one of the beams is therefore necessary to include station S in it. The coverages of the beams delimit geographical earth areas whose contours define boundaries on which links with satellite 1 are guaranteed with a minimum quality in terms of antenna gain or transmission error rate. These boundaries also define geographical points where a minimum link quality with satellite 1 is also guaranteed.

Two cases are considered according to this invention for the choice of the beam coverage to be modified so as to include station S: either according to a first case, this beam coverage is the coverage having the lowermost earth surface amongst all the beam coverage of the satellite, or else, according to a second case, this coverage is the coverage nearest to the station S. The two cases are handled separately by the control station and the solution offering the highest antenna gain by simulation in station S is selected (sub-step $E_{15}$).

According to the first case, the choice of the lowermost surface coverage results from the following observation: the lowermost surface coverage offers the highest antenna gain and hence is the most adequate to "enlarge" so as to include station S whilst maintaining a sufficient antenna gain. It is recalled that each beam offers antenna gain all the higher when the aperture angle of the beam is low. The determination of the coverage with the lowermost surface is made in control station SC by locating, in a representation of the type shown in FIG. 4, the coverage with a minimum geographical coverage by area computation.

Figure 8:
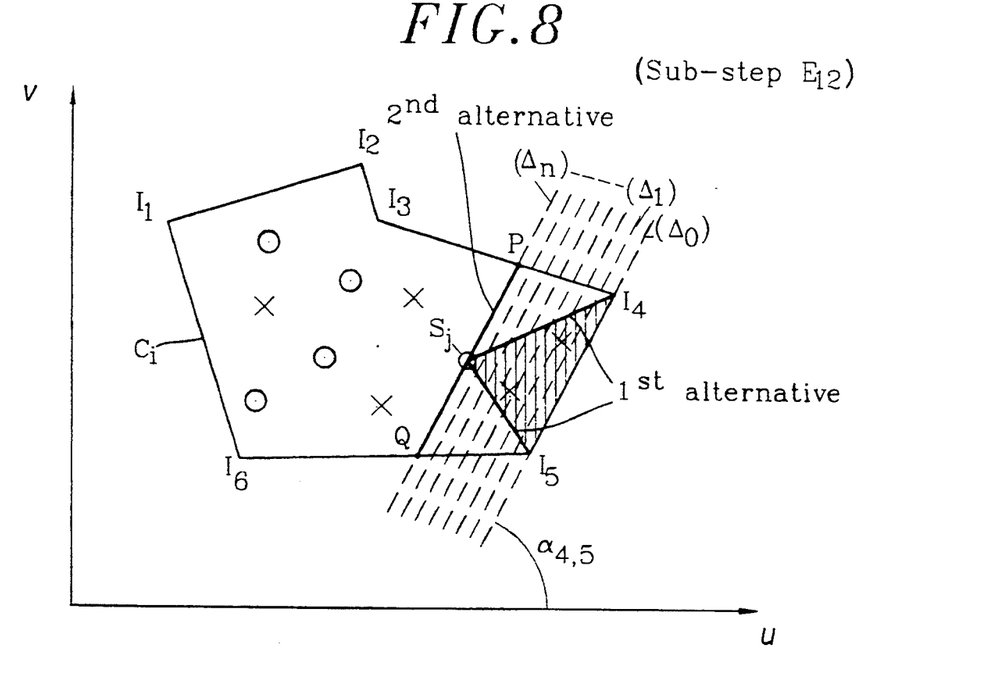
FIGS. 8 and 9 are beam coverage diagrams in the transformed reference system, in relation respectively with the reduction of a coverage and the insertion of an earth station in a beam coverage.

After the determination by computation of the lowermost surface coverage $C_d$ (sub-step $E_{11a}$), iteratively each $C_i$ of the coverages, with $1 \leq i \leq I$ and I designating the number of existing beam coverages at the moment of the setting-up request, is reduced according to a method (sub-step $E_{12a}$) described referring to FIG. 8, and a modification of the determined coverage $C_d$ is simulated to include in it station S at the level of its boundary (sub-step $E_{13a}$). Reductions in beam coverages are simulated until a modification of coverage $C_d$ to include station S leads to a sufficient antenna gain of the level of its modified boundary and hence of station S. As soon as a sufficient antenna gain for station S, at the level of its modified boundary of coverage $C_d$, can be obtained after i=L reductions in coverage, a simulated gain result is recorded.

According to the second case, the coverage $C_d$ nearest to the station S is firstly determined (sub-step $E_{11b}$). Then in the same way as in the first case above, each $C_i$ of the coverages, with $1 \leq i \leq I$ and I being the total number of coverages, is reduced (sub-step $E_{12b}$), and an insertion of station S in the determined coverage $C_d$ is simulated (sub-step $E_{13b}$). As a function of the gain obtained for station S, at the boundary of the modified coverage $C_d$ to include it, other coverages are reduced, and the theoretical gain results for station S in the respective modified coverages are recorded. It should be noted that the reduction, on emitting or receiving, of a satellite beam coverage, has the effect of reducing the power used by the satellite for this coverage. In view of a total available power in the satellite, the reduction of a coverage $C_i$ enables the enlargement of another coverage, in this case $C_d$. Priorities can be defined in the order of selecting the coverages $C_i$ to be reduced. Thus for example, it may appear of interest to initially reduce coverage $C_d$.

As indicated in sub-step $E_{15}$ in FIG. 5, as a function of the antenna gain results obtained for the two cases, i.e., the selection of the lowermost surface coverage and the selection of the coverage nearest to station S, the case offering the highest theoretical antenna gain for station S in the vicinity of the boundary of coverage $C_d$ is adopted. An emission authorization simulated for station S is set up for station $S_k$, aware that at the same time the simulated emission and reception authorizations should be obtained for stations $S_k$ and $S_l$ in order for the real emission authorization to be sent by control station SC.

The sub-steps $E_{11a}$ to $E_{14a}$ and $E_{11b}$ to $E_{14b}$, relating respectively to the parallel processings of the two coverage determination cases $C_d$ are now detailed, by notably introducing the representation of the coverages in the transformed reference system (u, v).

Sub-steps $E_{11a}$ to $E_{14a}$ relating to the first case are first of all studied.

It is recalled that step $E_{11a}$ determining the coverage with the lowermost surface takes place in the transformed system (u, v) by surface computation.

Figure 7:
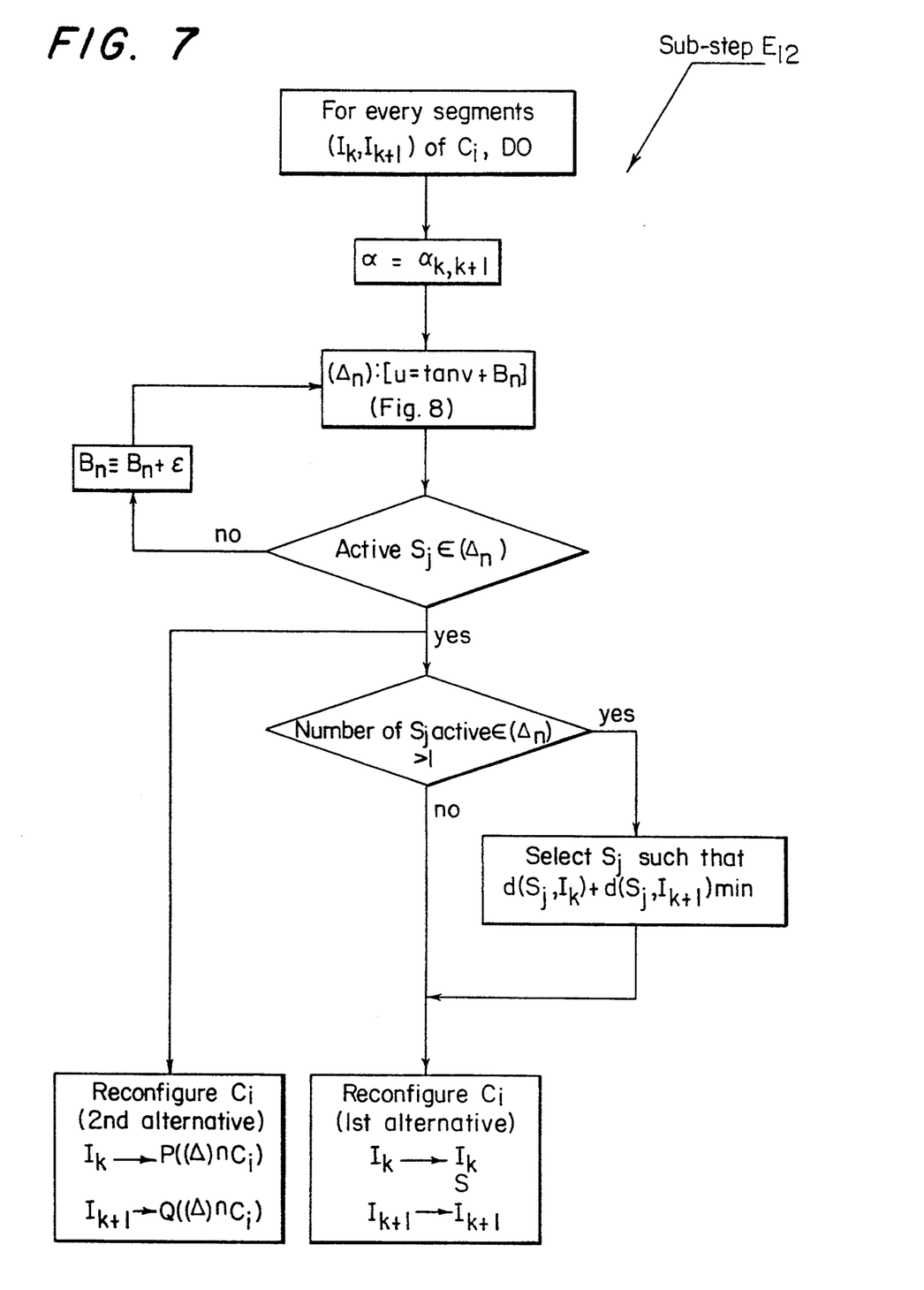

The reduction of any beam coverage $C_i$ during sub-step $E_{12a}$ is described below referring to FIG. 8. In the transformed system (u, v), each beam coverage is represented by a polygon and for example the beam coverage shown in FIG. 8 is delimited by a polygon with six apexes $I_1, I_2, I_3, I_4, I_5$ and $I_6$. For each side $(I_1, I_2), (I_2, I_3), \ldots, (I_5, I_6)$ and $(I_6, I_1)$ of the polygon, a sheaf of parametered straight lines $(\Delta_o)$ to $(\Delta_n)$ parallel to this side is determined. These parametered straight lines have the same director coefficients $\tan \alpha_{4,5}$ and are determined by the equations (FIG. 7):

$$u = (\tan \alpha_{4,5}) v + B_n,$$

in which $B_n$ is a parameter incremented by a predetermined step $\epsilon$, so that the straight lines are secant with the polygon in the direction to the interior of the coverage surface. As from each side of the polygon, control station SC selects the first of the parametered straight lines including an active earth station $S_i$ by using the discrete representation of coverage $C_i$ stored in control station SC. In FIG. 8, the active stations, emitting when $S=S_k$ or receiving when $S=S_l$, are designated by circles, whereas the inactive stations, i.e. neither emitting nor receiving, are designated by crosses.

Take for example a first active station $S_j$ belonging to a straight line of the parallel straight line sheaf nearest to the side $(I_4, I_5)$. Two alternatives are considered within the context of this invention to reduce the coverage $C_i$, relative to the side $(I_4, I_5)$.

According to a first alternative the coverage $(I_1, I_2, I_3, I_4, I_5$ and $I_6)$ is transformed into $(I_1, I_2, I_3, I_4, S_j, I_5$ and $I_6)$ for side $(I_4, I_5)$. In this discrete representation of the coverages, it is possible that several stations $S_j$, such as two stations $S_{j1}$ and $S_{j2}$, belong simultaneously to a first parametered straight line of the straight line sheaf including at least one station. To form the polygon $(I_1, I_2, I_3, I_4, S_j = (S_{j1}$ or $S_{j2}), I_5, I_6)$ is chosen the station, $S_{j1}$ or $S_{j2}$, for which the sum of distances $$(d(S_j, I_4) + d(S_j, I_5))$$

is the minimum, in which d designates the distance operator. This reduced polygon corresponds to a surface for which the coverage reduction is minimum.

According to a second alternative the coverage $(I_1, I_2, I_3, I_4, I_5, I_6)$ is transformed into $(I_1, I_2, I_3, P, Q, I_6)$ relatively to side $(I_4, I_5)$ in which P and Q respectively designate two intersection points of a first straight line of the parallel straight line sheaf, including at least one active earth station, with the sides $(I_3, I_4)$ and $(I_5, I_6)$ adjacent to the considered side $(I_4, I_5)$.

The two coverage reduction sub-steps $E_{12a}$ and $E_{12b}$ of the main algorithm in FIG. 5, according to the two alternatives, are summarized in the algorithm in FIG. 7. It should be noted that the reduction of the coverage of beam $C_i$ is not achieved only relatively to one side, such as side $(I_4, I_5)$, of the polygon associated to the coverage in the transformed reference system (u, v), but also relatively to all the sides of the polygon. After these various polygon reductions numbering not more than the number of sides of the polygon, the corresponding beam coverage reduction, when emitting or receiving, in satellite 1 is controlled by control station SC by programming beam-forming networks associated to the corresponding antenna of the satellite. This programming is achieved after the simulated emission/reception authorizations have been obtained for the calling station $S_k$ and called station $S_l$.

Figure 9:
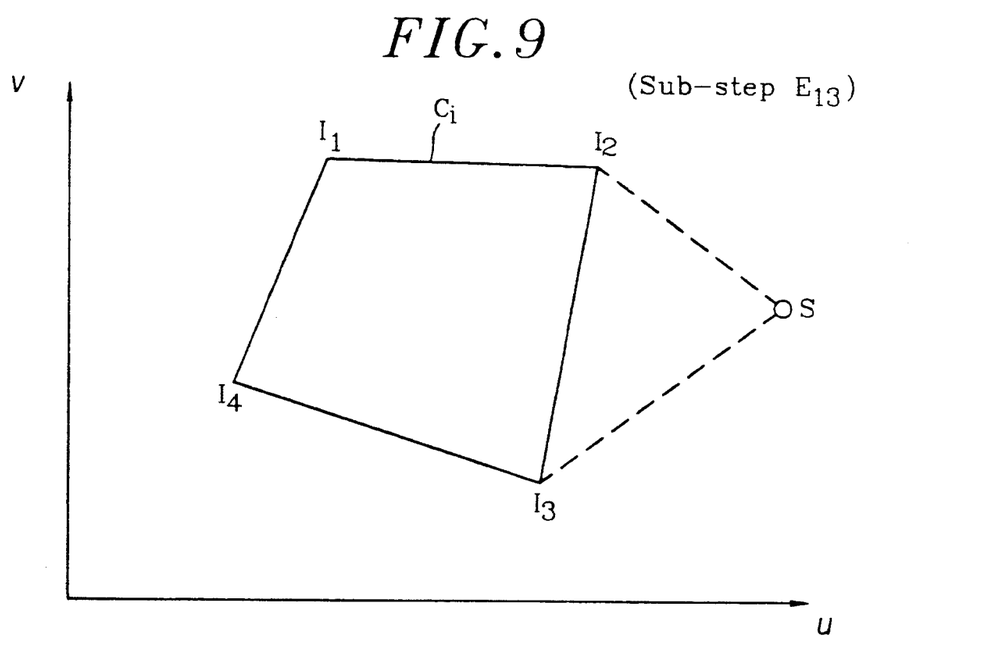

Referring to FIG. 9, sub-step $E_{13a}$ for inserting station S in the determined coverage $C_d$, here of lowermost surface, by simulation in control station SC is now detailed. In the diagram in FIG. 9, the polygon associated to a beam coverage $C_i$ comprises, for example, four apexes $I_1, I_2, I_3$ and $I_4$. The start of this insertion sub-step consists in determining the side $(I_p, I_{p+1})$ nearest to station S, here $(I_2, I_3)$. Then the beam coverage $(I_1, I_2, I_3, I_4)$ is modified into coverage $(I_1, I_2, S, I_3, I_4)$ whose surface is increased by adding the triangle ($I_2$, S, $I_3$), station S being the calling station $S_k$ or called station $S_l$ to be included in the beam, on receiving or emitting, of an antenna of satellite 1.

Concerning sub-steps $E_{11b}$ to $E_{14b}$ of the main algorithm, the sub-steps $E_{12b}$ and $E_{13b}$ are identical to sub-steps $E_{12a}$ and $E_{13a}$ described above, and sub-step $E_{11b}$ consists in the determination, by simulation in control station SC, of the coverage $C_d$ nearest to station S, i.e., station $S_k$ or $S_l$.

Figure 6:
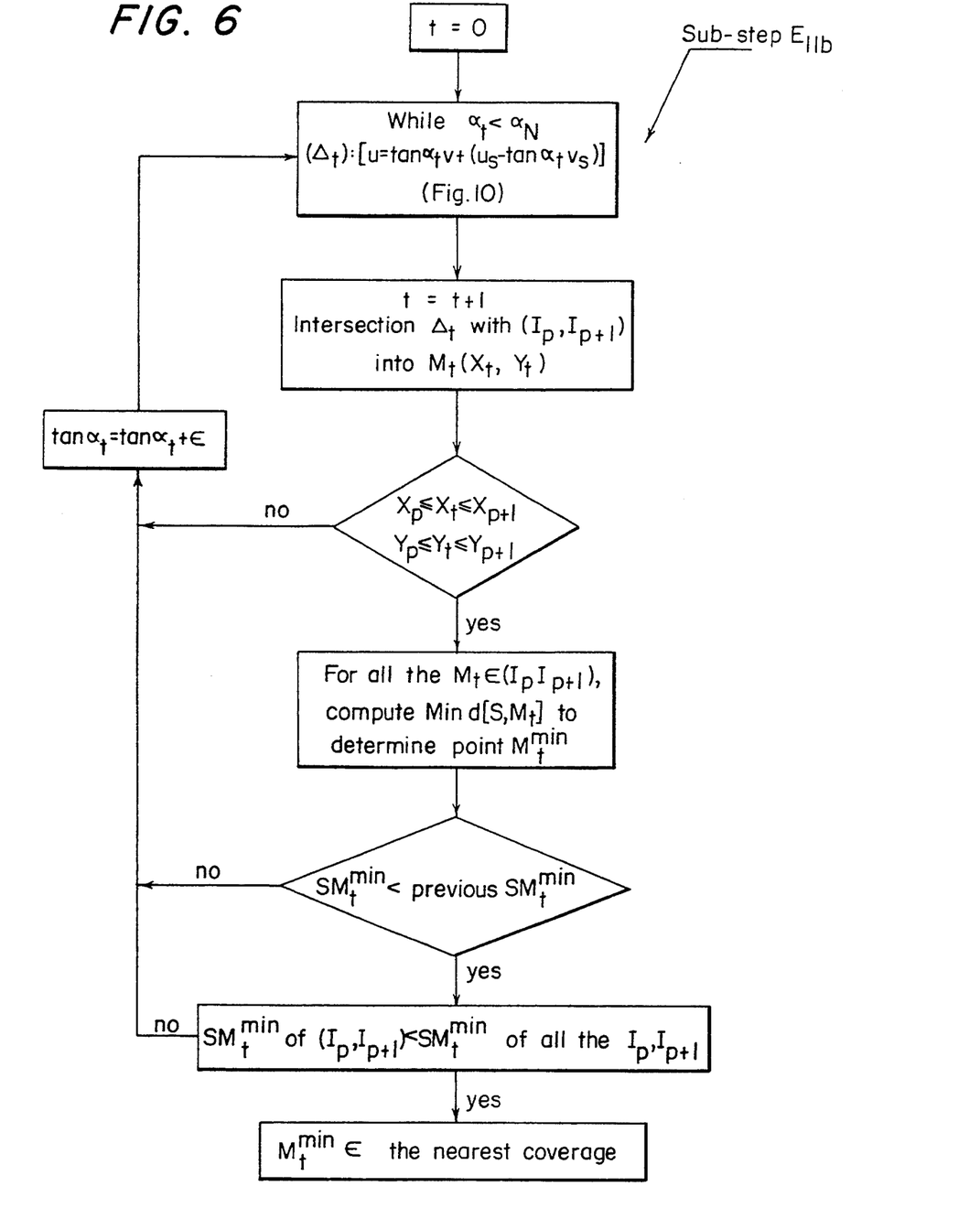
FIGS. 6 and 7 are two algorithms relating to two sub-steps of the main algorithm shown in FIG. 5, respectively.
Figure 10:
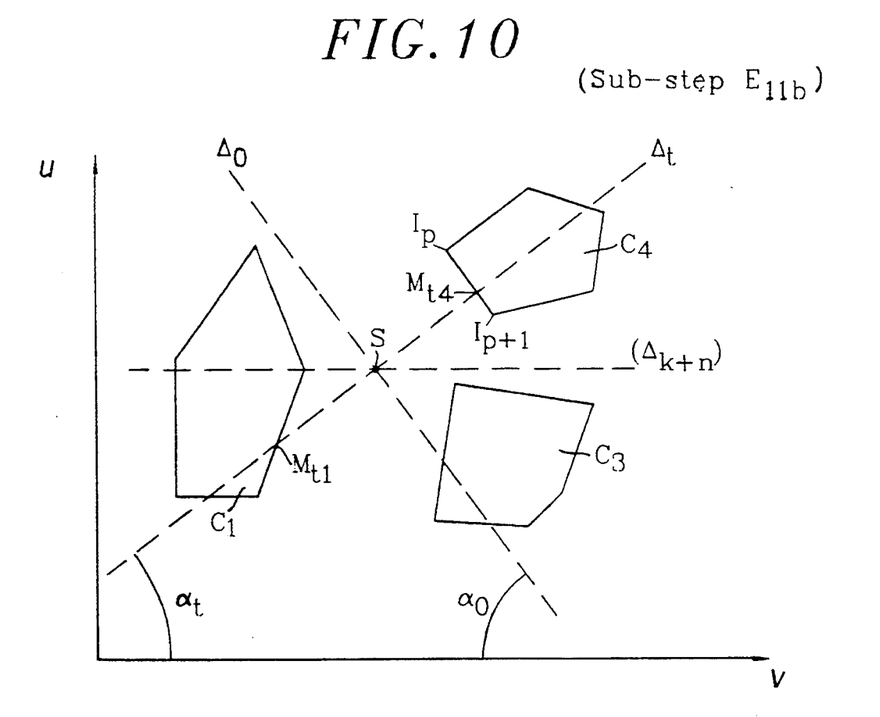
FIG. 10 is a beam coverage diagram in relation with the algorithm in FIG. 6.

Referring to FIG. 10, relative to sub-step $E_{11b}$, i.e., $C_i$ with i=1, 3 or 4, the coverage nearest to a station S, calling station $S_k$ or called station $S_l$, should be modified to include this station in it. A straight line sheaf ($\Delta_t$) passing through S with coordinates $u_S$ and $v_S$ is determined by the equations (FIG. 6):

$$u = (\tan \alpha_t)v + [u_S - (\tan \alpha_t) \cdot v_S]$$

by discretely incrementing a director coefficient $\tan \alpha_t$ as from that of a predetermined line $\Delta_o$ of this sheaf. For each straight line ($\Delta_t$) a/some point(s) of intersection of straight line ($\Delta_t$) with the polygon side(s) nearest to station S is/are computed. Thus by way of example in FIG. 10, the straight line ($\Delta_t$) possesses two intersection points $M_{t1}$ and $M_{t4}$ with two respective sides, such as ($I_p$, $I_{p+1}$), of the polygons associated to coverages $C_1$ and $C_4$. By successive iterations of the incrementation of the director coefficient $\tan \alpha_t$ parametering the straight line sheaf and the search for intersection points, a set of points:

$$\zeta_{MT} = \zeta M_t \varepsilon \Delta_k \cap (I_p, I_{p+1}) \neq \{\Phi\} \zeta$$

is obtained.

The minimum distance between the point associated to station S and any one of points $M_t$ is then determined. The side to which the intersection point $M_t$ with a minimum distance from station S belongs, is that of the beam coverage determined as the coverage nearest to station S.

The algorithm in FIG. 6 shows various sub-steps for determining the coverage nearest to station S ($E_{11b}$). In this algorithm the minimum distance is determined iteratively for each new parametered straight line ($\Delta_t$) by comparison of the distance of point $M_t$ of this straight line ($\Delta_t$) belonging to any segment of a coverage with the minimum distance measured until now.

Until now, only the first alternative has been dealt with according to which station S, $S_k$ or $S_1$, is not located within a emitting or receiving coverage of an antenna of satellite 1. As indicated by stage $E_2$ of the main algorithm (FIG. 5), the second alternative according to which station S is located within a beam coverage $C_i$ is now dealt with reference to FIG. 11.

It is assumed that the frequency bands are dedicated respectively to the beams of satellite 1, and that each of the beams carries channels in predetermined number NC, for example multiplexed frequency channels or resulting from any other type of multiplexing.

Figure 11:
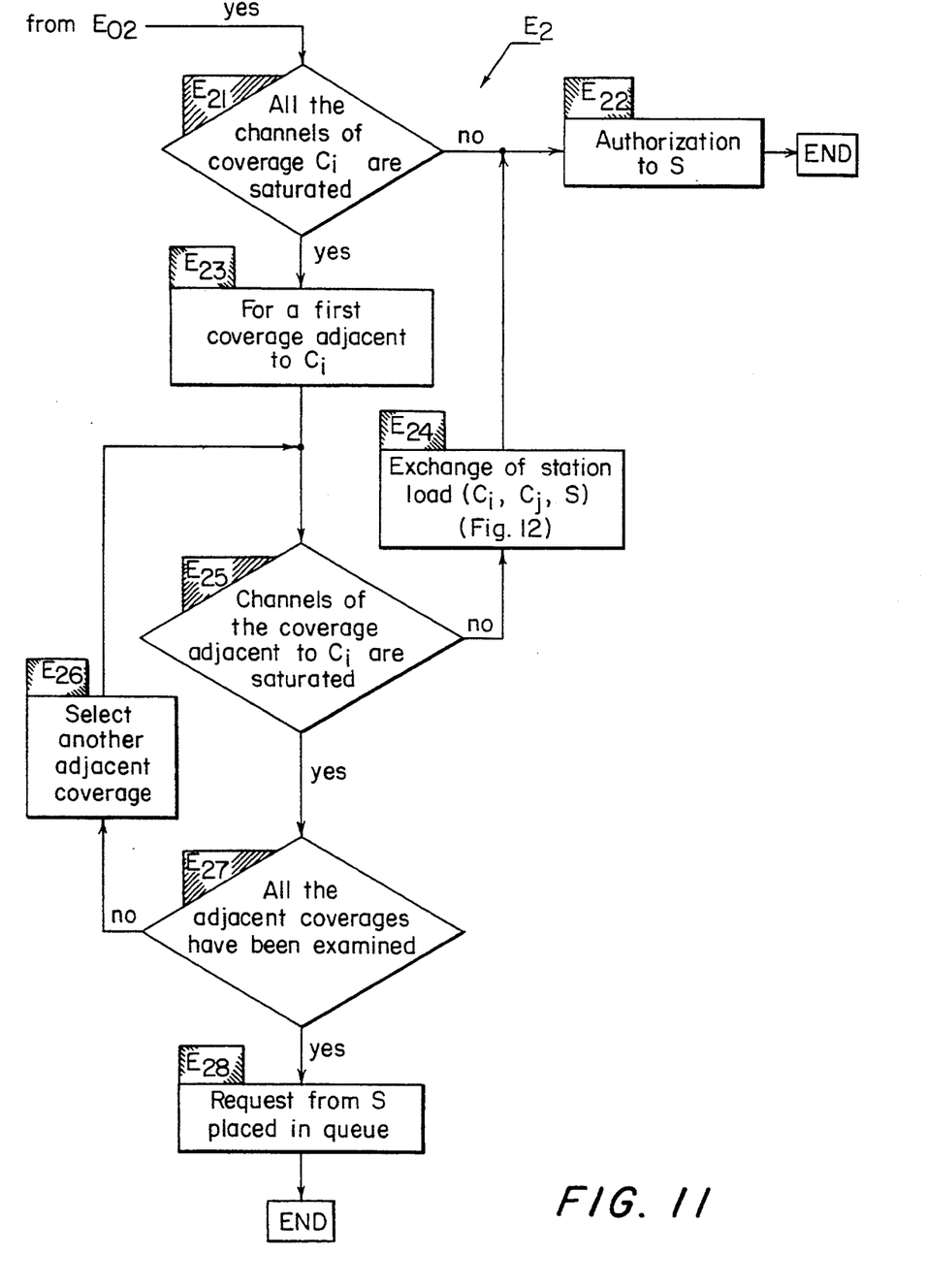
FIG. 11 is an algorithm depending on the main algorithm shown in FIG. 5, and managing the exchange of capacity between adjacent beams.

As signalled in sub-step $E_2$ in FIG. 11, control station SC checks the availability of the NC channels of coverage $C_i$ covering station $S_o$. If at least one of the NC channels is free for coverage $C_i$, i.e., if a modulation carrier associated to coverage $C_i$ can be used for receive or emit by station S, then a simulated authorization is given to station S. It is recalled that the real emission/reception authorization is conditioned in control station SC by simulated authorizations, both relating to the calling station $S_k$ and called station $S_l$.

When all the NC channels of coverage $C_i$ are busy, the control station searches from amongst the coverages adjacent to coverage $C_i$ including station S, one of those whose a beam has a free channel. This search is made according to a predetermined order of priority of adjacent coverages and/or preferably by selecting the coverage with the smallest number of busy channels. Two beam coverages are said to be "adjacent" when their angular separation is such that their is no coverage inserted between them.

If none of the examined coverages adjacent to coverage $C_i$ possesses at least one free channel, then the setting-up request from station S is rejected or placed in the queue of station SC. When the station is the calling station $S_k$ or called station $S_l$, the link between the two stations $S_k$ and $S_l$ is not then set up.

If a first coverage adjacent to coverage $C_i$ and including at least one free channel is detected, a sub-step is then carried out for exchanging loads between the beams of these coverages, as indicated in $E_{24}$ in FIG. 11.

Figure 12:
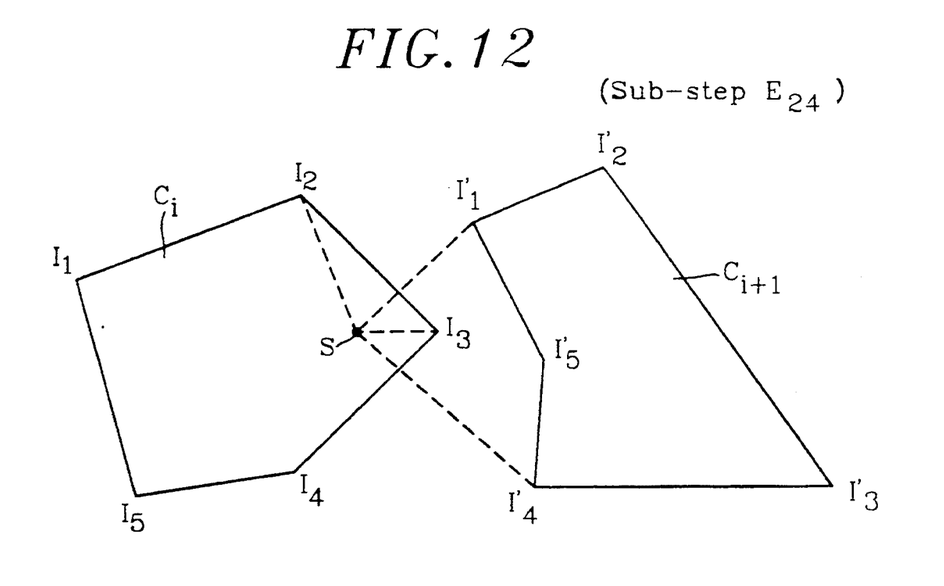
FIG. 12 is a pattern of two beam coverages in relation with the algorithm in FIG. 10.

This sub-step of exchanging loads between beams is shown graphically in FIG. 12. According to this FIG. 12, take $C_i$ as the beam coverage initially including station S and having all its channels busy, and $C_{i+1}$ a coverage adjacent to coverage $C_i$ with at least one free channel, these two coverages being initially delimited by continuous line polygonal contours.

First of all, side ($I_p$, $I_{p+1}$) of the polygon of coverage $C_i$ nearest to station S is determined in the transformed reference system (u, v). This side is preferably determined in the same way as in sub-step $E_{11b}$, by using a straight line sheaf with incremented director coefficient. In FIG. 12 this side of the coverage $C_i$ is ($I_2$, $I_3$). Then coverage $C_i$ is reduced by joining the two apexes $I_2$ and $I_3$ of this side to the point of station S so that the side ($I_2$, $I_3$) is replaced by the two sides ($I_2$, S) and (S, $I_3$), as shown by a broken line in FIG. 12. Nevertheless the reduction of the coverage $C_i$ can be accomplished according to the second alternative shown in FIG. 8 for which the side ($I_2$, $I_3$) is replaced by a side (P,Q) parallel to it and passing through point S.

Then, for coverage $C_{i+1}$ adjacent to coverage $C_i$ and possessing at least one free channel, two sides of the polygon delimiting coverage $C_{i+1}$ nearest to station S are determined. As previously in sub-step $E_{11b}$, this determination is obtained by means of a sheaf of straight lines passing through S, with incremented director coefficients. In FIG. 12, these two sides of the coverage $C_{i+1}$ are ($I'_4$, $I'_5$) and ($I'_5$, $I'_1$). Then coverage $C_{i+1}$ is enlarged so as to include station S in it, by joining the two far end apexes $I'_1$, $I'_4$ of these two sides ($I'_4$, $I'_5$) and ($I'_5$, $I'_1$) to the point of station S, so as to form two sides ($I'_4$, S) and (S, $I'_1$) as shown in broken line in FIG. 12. Thus station S is included in modified coverage $C_{i+1}$, and a free channel of the beam of this coverage $C_{i+1}$ is allocated by control station SC to station S to emit or receive.

Simultaneously, the address of station S is withdrawn from the channel allocation memory in station SC associated to coverage $C_i$, and this coverage $C_i$ initially covering station S is reduced by controlling a reduction in emission or reception power, of the antenna of satellite 1 supplying coverage $C_i$, by modifying the control coefficients of the phase shifters and power dividers of the configuration network of this antenna as a function of coverage $C_i$ thus defined.

Thus the invention provides an original method for reconfiguring satellite beams, taking account of the limited power, both for emit and receive, in the satellite, and makes use of discrete points for each beam contour in the transformed reference system (u, v) considerably simplifying certain steps or sub-steps in the method.

What we claim is:

1. In a satellite retransmitting telecommunications system including a satellite (1), a plurality of earth stations (S1–S8) having earth station beam-forming means for transmitting beams, respectively, and a control station (SC), said satellite comprising an antenna including a plurality of radiating elements ($ER_1$–$ER_N$), and satellite beam-forming means for producing from said antenna a selected one of a plurality of satellite beam coverages, said satellite beam-forming means including variable power divider means, and variable microwave phase shifter means;

the method for reconfiguring the satellite beam coverages retransmitted by the satellite to the earth stations by modifying said phase shifting means and said variable power divider means, thereby to establish a telecommunication link between a given calling station and a given called station via said satellite subsequent to a request from said calling station to a control station via a signalling channel of said satellite, which comprises the steps of:

(a) determining whether the calling and called stations are contained within the existing satellite beam coverages; and (b) in the first event that said calling and called stations are not contained within existing coverages:

(1) determining amongst all said satellite beam coverages, a coverage nearest to said each of the calling and called stations;

(2) iteratively, reducing in size each of the satellite beam coverages other than said nearest coverage, until said nearest coverage is modified to include in said nearest coverage said each of the called and calling stations with a first antenna gain; and (3) deriving a simulated link setting-up authorization for said each of the calling and called stations when one of said channels associated to said nearest coverage is free;

(c) said satellite beam forming means being alternatively operable in the second event that each of said calling and called stations are located within one of said satellite beam coverages, and when at least one of said channels associated with at said one coverage is free, for:

(1) deriving a simulated link initiation authorization for each of the calling and called stations, and (2) when all said channels associated to said one of the coverages are busy, searching a coverage adjacent to said each of the calling and called stations and having an associated free channel, and in response to a searching having a positive result, exchanging of station load between said one of the coverages and said adjacent coverage by reducing said one of the coverages and increasing said adjacent coverage to that said each of the calling and called stations is located in said adjacent coverage, and deriving a simulated link setting-up authorization for said each of the calling and called stations; and (d) when simulated link setting-up authorizations are derived both for said calling and called stations, emitting an emission authorization for said calling station and phase shift and power control values from said control station to said satellite to reconfigure said satellite beam coverages.

2. A method as claimed in claim 1, and further including the additional parallel steps, upon the occurrence of said first event, of:

(4) determining amongst all said coverages a lowermost surface coverage;

(5) iteratively, reducing in size each of said coverages other than said lowermost surface coverage whilst maintaining in said coverages stations which are active prior to said link setting-up request, until said lowermost surface coverage is increased to include in said lowermost surface coverage said each of the calling and called stations with a second antenna gain, then (6) selecting one of said lowermost surface coverage and nearest coverage into a selected coverage as a function of the higher of said first and second antenna gains to include said station in said selected coverage, and (7) deriving a simulated link setting-up authorization for said each of the calling and called stations when one of said channels associated to said selected coverage is free.

3. A method as claimed in claim 1, wherein said first event results in the steps of:

(4) determining amongst all said coverages a lowermost surface coverage;

(5) iteratively, reducing in size each of said coverages other than said lowermost surface coverage whilst maintaining in said coverages stations which are active prior to said link setting-up request, until said lowermost surface coverage is increased to include in said lowermost surface coverage said each of the calling and called stations with a second antenna gain; and (6) deriving a simulated link setting-up authorization for said each of the calling and called stations when one of channels associated to said lowermost surface coverage is free.

4. A method as claimed in claim 1, wherein said coverage reducing step in said first event takes place according to a predetermined order of priority relating to said each of the satellite beam coverages other than said nearest coverage.

5. A method as claimed in claim 1, wherein, at each time, said coverages of said earth emitting-receiving stations are memorized in said control station in the form of discrete points associated to contour points of said coverages, in a transformed reference system defined (u, v) given by:

$$u = \sin \theta \cos \Phi$$

$$v = \sin \theta \sin \Phi$$

in which $\theta$ and $\Phi$ respectively, designate elevation and azimuth coordinates in a spherical reference system centered on said radiating means of said satellite, each of said coverages being memorized by means of said transformation in the form of an associated polygon comprising a discrete points respectively associated to contour points of said each of the coverages, and each of said earth emitting-receiving stations being memorized by means of said transformation in the form of a discrete point associated to a geographic localization point of said each of the earth emitting-receiving stations.

6. A method as claimed in claim 5, wherein said step of determining coverage adjacent each of the calling and called stations further comprises, relating to said transformed reference system, the steps of:

(a) incrementing a director coefficient to define a sheaf of straight lines each passing through a discrete point associated to said each of the calling and called stations and intercepting coverage polygon sides into respective intersection points;

(b) computing distances between said discrete point associated to said each of the calling and called stations and said intersection points; and (c) selecting a minimum distance from said computed distances, and determining a coverage which is memorized in said control station in the form of an associated polygon the satellite beam having a side nearest to said discrete point associated with said each of the calling and called stations.

7. A method as claimed in claim 5, wherein said step of reducing in size each of the coverages other than said nearest coverage further comprises, for each side of a polygon associated to said each of the coverages in said transformed reference system, the steps:

(a) defining step-by-step straight lines parallel to said each side and secant with said polygon associated to said each of the coverages; and (b) selecting one of said straight lines which includes the discrete point associated to an active earth station located in said each of the coverages and is nearest to said each side into a selected straight line, said selected straight line forming a side of said polygon associated to said each of the coverages reduced in size.

8. A method as claimed in claim 5, wherein said step of reducing in size said each of the coverages other than said nearest coverage further comprises for each side of a polygon associated to said each of the coverages in said transformed reference system, the steps of:

(a) defining step-by-step straight lines parallel to said each side and secant with said polygon associated to said each of the coverages, (b) selecting one of said straight lines which includes the discrete point associated to an active earth station located is said each of the coverages and is nearest to said each side into a selected straight line, and (c) connecting said discrete point associated to said active station with two far ends of said each side into two sides of said each of the coverages.

9. A method as claimed in claim 5, wherein said station load exchanging step between said one of the coverage and said adjacent coverage comprises the steps of:

(a) determinating a first side of a polygon associated with said one of the coverages and nearest to a discrete point associated with said each of the calling and called stations, (b) reducing said one of the coverages by replacing said first side by two sides joining far ends of said first side to a discrete point associated to said station, (c) determinating two second sides of said adjacent coverage nearest to said station, and (d) enlarging of said adjacent coverage by replacing said two second sides by two sides joining opposing far ends of said two second sides to said discrete point associated to said each of the calling and called stations.

* * * * *